(12) United States Patent
Ren

(10) Patent No.: US 7,490,161 B2
(45) Date of Patent: Feb. 10, 2009

(54) METHOD AND SYSTEM FOR IMPLEMENTING OSPF REDUNDANCY

(75) Inventor: Wenge Ren, Sunnyvale, CA (US)

(73) Assignee: Nokia Inc., Irving, TX (US)

( * ) Notice: Subject to any disclaimer, the term of this patent is extended or adjusted under 35 U.S.C. 154(b) by 568 days.

(21) Appl. No.: 09/934,884

(22) Filed: Aug. 22, 2001

(65) Prior Publication Data

US 2003/0056138 A1    Mar. 20, 2003

(51) Int. Cl.
  *G06F 15/173*    (2006.01)
(52) U.S. Cl. .................. 709/238; 709/224; 709/226; 709/239; 709/248; 370/238
(58) Field of Classification Search ............... 709/203, 709/224, 238, 248, 230, 226, 239; 713/153; 370/238
See application file for complete search history.

(56) References Cited

U.S. PATENT DOCUMENTS

| | | | |
|---|---|---|---|
| 4,466,098 A | | 8/1984 | Southard |
| 5,835,696 A | | 11/1998 | Hess |
| 6,049,524 A | * | 4/2000 | Fukushima et al. .......... 370/220 |
| 6,112,248 A | | 8/2000 | Maciel et al. |
| 6,148,410 A | * | 11/2000 | Baskey et al. .................. 714/4 |
| 6,173,324 B1 | | 1/2001 | D'Souza |
| 6,195,705 B1 | | 2/2001 | Leung |
| 6,351,755 B1 | | 2/2002 | Najork et al. |
| 6,392,990 B1 | | 5/2002 | Tosey et al. |
| 6,397,260 B1 | * | 5/2002 | Wils et al. .................... 709/238 |
| 6,424,629 B1 | | 7/2002 | Rubino et al. |
| 6,427,213 B1 | | 7/2002 | Dao |
| 6,430,622 B1 | * | 8/2002 | Aiken et al. ................. 709/245 |
| 6,487,605 B1 | * | 11/2002 | Leung ......................... 709/245 |

(Continued)

FOREIGN PATENT DOCUMENTS

WO    WO 96/21985    7/1996

(Continued)

OTHER PUBLICATIONS

Microsoft Computer Dictionary 5th Edition, (pp. 111 and 285).*

(Continued)

*Primary Examiner*—Saleh Najjjar
*Assistant Examiner*—Shawki Ismail
(74) *Attorney, Agent, or Firm*—Squire, Sanders & Dempsey L.L.P.

(57) ABSTRACT

The present invention relates to a method and system for implementing link level protocol redundancy in a router. In particular, the invention relates to providing redundancy of the Open Shortest Path First (OSPF) routing protocol. An active processor provides OSPF operations. In the present invention, a standby processor is coupled to the active processor. During an initial synchronization, all network link protocol information from the active processor is forwarded to the standby processor. The network link information can include OSPF state information, OSPF configuration information, OSPF adjacencies information, OSPF interface information and OSPF global protocol information. Thereafter, any updates of network link protocol information are immediately forwarded to the standby processor. Upon failure of the active processor, the router is switched to the standby processor and all OSPF protocol operations are performed on the standby processor. In the present invention, all states of the link protocol immediately function as if a failure had not occurred.

45 Claims, 5 Drawing Sheets

U.S. PATENT DOCUMENTS

| | | | | |
|---|---|---|---|---|
| 6,529,481 | B2* | 3/2003 | Akyol et al. | 370/250 |
| 6,556,547 | B1* | 4/2003 | Srikanth et al. | 370/317 |
| 6,601,101 | B1* | 7/2003 | Lee et al. | 709/227 |
| 6,762,999 | B2* | 7/2004 | Akyol et al. | 370/250 |
| 6,820,134 | B1* | 11/2004 | Zinin et al. | 709/238 |
| 6,941,377 | B1* | 9/2005 | Diamant et al. | 709/230 |
| 6,950,427 | B1* | 9/2005 | Zinin | 370/386 |
| 6,954,794 | B2* | 10/2005 | Rudd et al. | 709/230 |
| 6,959,334 | B1* | 10/2005 | Massengill | 709/223 |
| 6,983,294 | B2* | 1/2006 | Jones et al. | 707/202 |
| 7,065,059 | B1* | 6/2006 | Zinin | 370/312 |
| 7,292,535 | B2* | 11/2007 | Folkes et al. | 370/238 |
| 2002/0078232 | A1* | 6/2002 | Simpson et al. | 709/238 |
| 2003/0218982 | A1* | 11/2003 | Folkes et al. | 370/238 |
| 2005/0265260 | A1* | 12/2005 | Zinin et al. | 370/255 |

FOREIGN PATENT DOCUMENTS

| | | |
|---|---|---|
| WO | WO 00/49792 | 8/2000 |

OTHER PUBLICATIONS

Microsoft Computer Dictionary 5th Edition, copyright 2002 (pp. 111 and 285).*

D. McPherson, "Bolstering IP Routers for High Availability," Internet Citation, Apr. 2, 2001, XP-002253716, URL:www.com-msdesign.com.

"Cisco's Flagship Switching Platform Scales to Enhance E-Commerce Networks," Internet Citation, Sep. 19, 2000, XP-002253729, URL:www.cisco.com.

L. Kane et al., VLS Protocol Specification; <draft-rfced-info-kane-00.txt>, Cabletron Systems Incorporated, May 1997.

T. Li et al., "Cisco Hot Standby Router Protocol (HSRP)," Juniper Networks, Cisco Systems, Mar. 1998.

* cited by examiner

METHOD AND SYSTEM FOR IMPLEMENTING OSPF REDUNDANCY

BACKGROUND OF THE INVENTION

1. Field of the Invention

This invention relates to network communications and more particularly to redundancy of routing protocols, such as the Open Shortest Path First ("OSPF") protocol and apparatus for protecting protocol services of a router and neighbor routers from failure.

2. Related Art

The Internet Protocol ("IP") is the foundation for many public, such as the Internet, and private, such as a corporate Intranet, data networks. Convergence of voice, data and multimedia networks has also been largely based on IP-based protocols.

Data packets progress through the data networks by being sent from one machine to another towards their destination. Routers or other types of switches are used to route the data packets over one or more links between a data source, such as a customer's computer connected to the data network, and a destination. Routing protocols such as Border Gateway Protocols ("BGP"), Routing Information Protocol ("RIP"), and Open Shortest Path First Protocol ("OSPF") enable each machine to understand which other machine is the "next hop" that a packet should take towards its destination. Routers use the routing protocols to construct routing tables. Thereafter, when a router receives a data packet and has to make a forwarding decision, the router "looks up" in the routing table the next hop machine. Conventionally, the routers look up the routing table using the destination IP address in the data packet as an index.

In the basic OSPF algorithm, a router broadcasts a hello packet including the router's own ID, neighbors' IDs the router knows and also receives such messages from other routers. If a router receives a Hello packet, which includes its own ID, from another router that the router has been aware of, on the understanding that the two routers have become aware of each other, the two routers exchange network link-state information by sending routing protocol packets. The router creates a routing table based on the network link-state information collected by running the link-state routing algorithm, typically the Dijkstra algorithm. In OSPF, the routing table can specify the least-cost path, based on a cost determined by considering many factors including network link bandwidth, as the packet route. When a network link changes, each router calculates the shortest path for itself to each of the networks and sets its own routing table accordingly to the paths. A route calculation unit is used for creating a routing table.

Each router, while it transmits or receives control packets and network link-state information, manages the states of other routers on the network to which this router is connected and also manages the states of the interfaces through which this router is connected to networks. With regard to the states of routers, each router manages the routers' ID's, and checks if each of those routers is aware of this router, or checks if each of those routers has completed the transmission and reception of network link-state information. With regard to interface state, each router manages the addresses of the interfaces and other routers connected to a network to which an interface is connected.

When conventional IP edge routers lose their primary circuitry and operation falls back to a redundant controller, a five to fifteen minute outage ensues while the router releases the routing states and packet forwarding tables. In order to enhance the reliability of the router device, it is important to multiplex the above-mentioned route calculation units. The multiplex router device includes a plurality of route calculation units, and always has one route calculation unit placed in the active mode to make it execute an ordinary process while keeping the remaining route calculation units in a standby mode. When the route calculation unit in the active mode runs into trouble, the multiplex router device brings one of the waiting route calculation units into the active mode (this is referred to as a system switchover of route calculation units), and the one other route calculation unit takes over and continues to execute the process that was previously being executed by the route calculation unit in trouble.

U.S. Pat. No. 6,049,524 describes a multiplex router device which reduces the amount of information to be transmitted from a route calculation unit in operation to a route calculation unit in standby mode. The route calculation unit in the active mode is connected by an internal bus to the route calculation unit in the standby mode. The route calculation unit in the active mode stores network link state information showing connections of the router and other routers with networks, neighboring router states showing states of neighboring routers and interface states showing states of network interfaces to connect the multiplex router device to the network. The route calculation unit in the active mode sends to the route calculation unit in the standby mode only the network link state information. In the route calculation unit in the standby mode, a database integration module that received the link-state information stores its contents in a link-state database. When a failure occurs in the route calculation unit in the active mode, the route calculation unit performs the routing protocol process by using the stored link-state database, so it is not necessary to exchange information with other routers to collect the network link state information over again. For awhile after the switchover to active mode the route calculation unit has no information about the neighbor route state and interface state. Hello packets are transmitted from the route calculation unit brought into the active state. The route calculation brought into the active state gradually accumulates information about the neighbor router states and interface states in order to gradually bring a complete list of ID's of other routers which is included in later Hello packets that the route calculation unit sends out.

It is desirable to provide high network availability by providing improved redundancy which can be implemented as a link level protocol running over IP having a backup link level process in total real time synchronization with an active one in order to enable an expeditious switchover when a failure occurs on the active control card.

SUMMARY OF THE INVENTION

The present invention relates to a method and system for implementing link level protocol redundancy in a router. In particular, the invention relates to providing redundancy of the Open Shortest Path First (OSPF) routing protocol. An active processor provides OSPF operations. In the present invention, a standby processor is coupled to the active processor. During an initial synchronization, all network link protocol information from the active processor is forwarded to the standby processor. The network link information can include OSPF state information, OSPF configuration information, OSPF adjacencies information, OSPF interface information and OSPF global protocol information. Thereafter, any updates of network link protocol information are immediately forwarded to the standby processor in an orderly and controlled manner. Upon failure of the active processor, the router is switched to the standby processor and all OSPF protocol operations are performed on the standby processor. In the present invention, all states of the link protocol immediately function as if a failure had not occurred. Neighbor routers will not notice any difference after switch-over, and no additional information is needed from neighbor routers after the switch-over. Accordingly, the router's forwarding capability will remain unaffected and a neighbor router will not notice that a system failure has occurred.

In an embodiment of the present invention, a hidden OSPF interface is determined at the active processor and the standby processor for each area of the router during the initial synchronization. The hidden interface is considered a point-to-point unnumbered interface which is not exposed to the outside world. A link-state database of the active processor is synchronized with the standby processor using the hidden OSPF interface. Link-protocol information is also forwarded from the active processor to the standby processor over the hidden OSPF interface. Upon synchronization of the standby processor with the active processor, the hidden OSPF interface for each area is removed.

In the present invention the active and standby OSPF processors stay in a highly synchronized state, referred to as a hot-standby state. Accordingly, an expeditious switchover to the standby processor occurs when the active processor fails.

The invention will be more fully described by reference to the following drawings.

DETAILED DESCRIPTION

Figure 1:
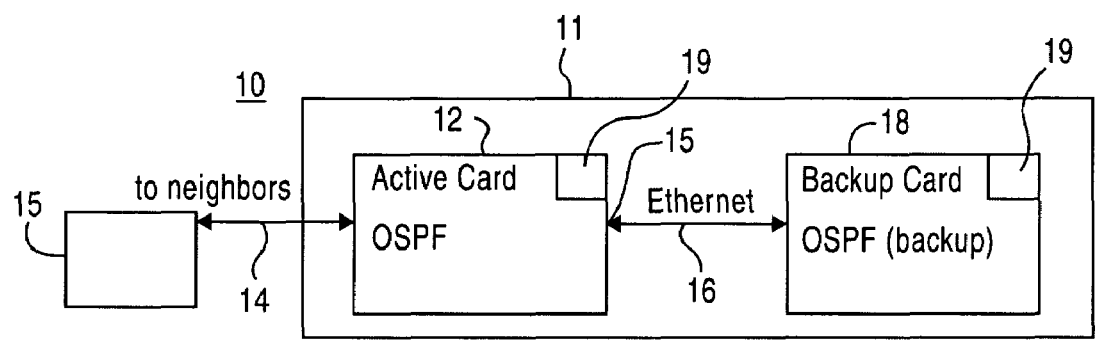
FIG. 1 is a schematic diagram of a system for implementing OSPF redundancy.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of a system for implementing link protocol redundancy in a router 10 in accordance with the teachings of the present invention. Router 11 includes active OSPF control card 12. Active OSPF control card 12 performs OSPF operations. OSPF operations include mechanisms for building maintaining and verifying one or more adjacencies 14 to one or more neighbor routers 15, exchanging network information with neighbors and updating best network routes to a local routing table. When a link-state database of two neighboring routers is synchronized, the routers are referred to as adjacent. Adjacencies control distribution of routing-protocol packets which are sent and received only at adjacencies.

Standby OSPF control card 18 is removably coupled to router 11. In the absence of standby OSPF control card 18, active OSPF control card 12 operates in a non-redundant mode. Active OSPF control card 12 communicates network link protocol information 15 over communication channel 16 to standby OSPF control card 18. Preferably, communication channel 16 is a fast and reliable communication channel. For example, communication channel 16 can be a duplex Ethernet. Network link protocol information 15 can be forwarded in the form of Inter Process Control (IPC) messages. The same redundancy software for OSPF operations 19 runs on both active OSPF control card 12 and standby OSPF control card 18. Redundancy software for OSPF operations 19 controls updating of network link protocol information 15 between active OSPF control card 12 and standby OSPF control card 18 and distinguishes between an active mode and a backup mode using system state information, as described in more detail below.

One embodiment of the present invention utilizes OSPF protocols running on the Amber Network ASR2000 router (or, alternatively, the ASR2020). The Amber Network ASR2000 and ASR2020 technical manuals are incorporated herein by reference as if fully set out. Active OSPF control card 12 and standby OSPF control card 18 are processors which are coupled to a line card and ASIC driver of router 11. It will be appreciated that although system 10 is described in terms of the OSPF protocol the teachings of the present invention can be used with other conventional link protocols.

After standby OSPF control card 18 is coupled to router 11, an initial synchronization is performed as a bulk update of network link information 15 from running active OSPF control card 12 to standby OSPF control card 18 using redundancy software for OSPF operations 19. Network link information 15 can include configuration, state and learned information.

After the initial synchronization, ospf active and standby processes become fully redundant, an OSPF process running in the redundancy software for OSPF operations 19 operates in an incremental updating mode. Updates can be posted to active OSPF control card 12. All updates are forwarded to standby OSPF control card 18. Standby OSPF control card 18 receives all OSPF messages and updates in order to maintain total real time synchronization between active OSPF control card 12 and standby OSPF control card 18. Accordingly, standby OSPF control card 18 mirrors active OSPF control card 12 for implementing redundancy. In this state, referred to as hot-standby, active OSPF control card 12 and standby OSPF control card 18 maintain a substantially synchronous state. Thereafter, if a failure of active OSPF control card 12 occurs, standby OSPF control card 18 will become active and be capable of immediately taking over all operations which were previously performed by active OSPF control card 12.

Figure 2:
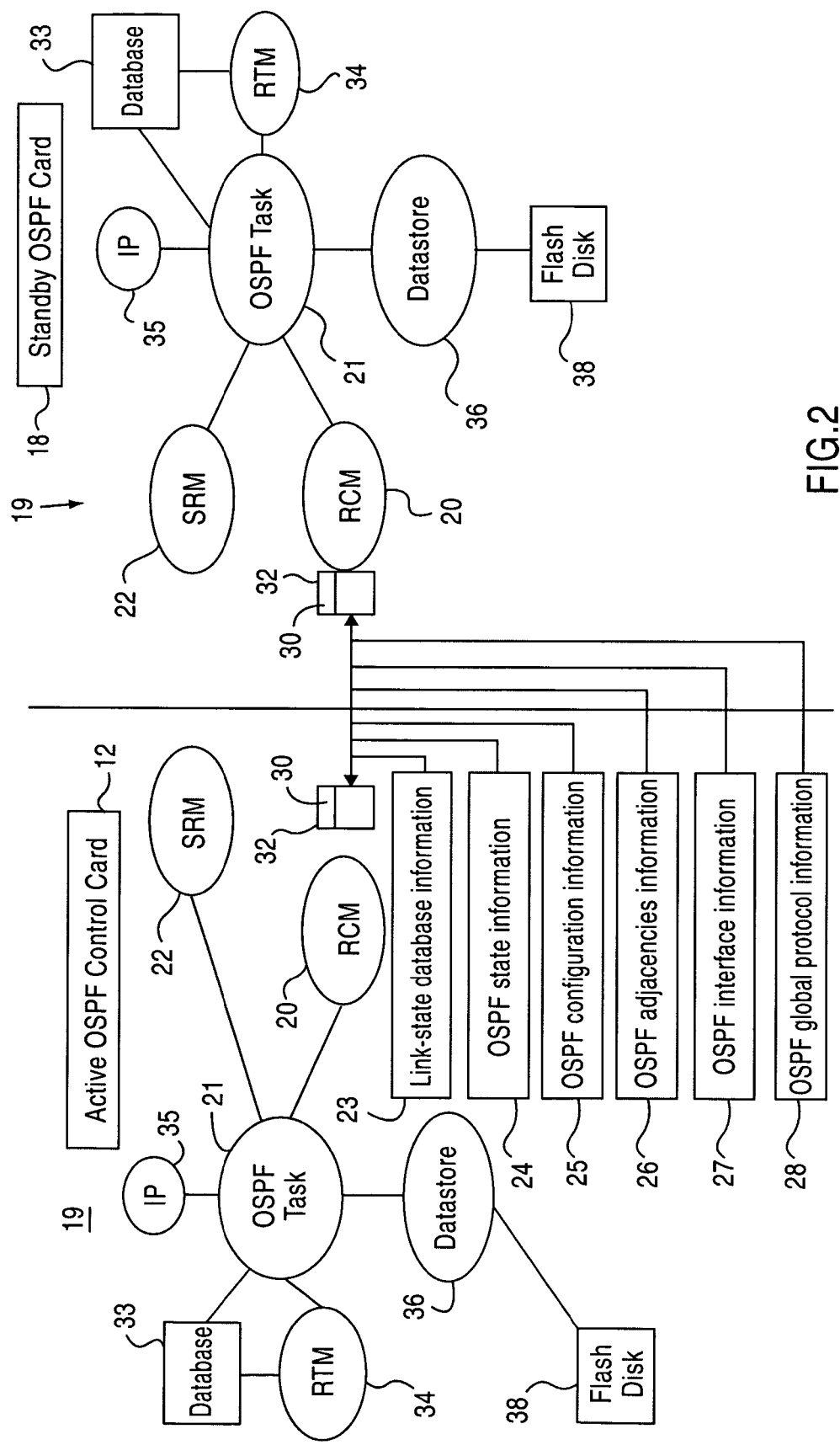
FIG. 2 is a schematic diagram of a redundancy software implementation.

FIG. 2 illustrates a detailed schematic diagram of redundancy software for OSPF operations 19 of active OSPF control card 12 and standby OSPF control card 18. Redundant card manager (RCM) 20 is a task that maintains a synchronization state machine for each task. All tasks of redundancy software for OSPF operations 19 of active OSPF control card 12 interact with RCM 20 to send network link information 15 to standby OPF control card 18. OSPF task 21 is a task for determining a status of OSPF processes running on active OSPF control card 12. Software redundancy manager 22 is a module that interacts with RCM 20 for determining switching over from an active state in which active OSPF control card 12 performs OSPF operation to a standby state in which standby OSPF control card 18 takes over OSPF operations.

During an initial synchronization, redundant card manager (RCM) 20 on standby OSPF control card 18 contacts OSPF task 21 on active OSPF control card 12 for retrieving task information. OSPF task 21 on active OSPF control card 12 automatically processes OSPF messages and calculates routes stored in routing table manager (RTM) 34. Active OSPF control card 12 marks corresponding internal states and transfers link-state database information 23, OSPF state information 24 and OSPF configuration information 25, OSPF adjacencies information 26, OSPF interface information 27 and OSPF global protocol information 28 to backup OSPF control card 18 through RCM 20.

During the initial synchronization, locks can be used with active OSPF processes running on active OSPF control card 12. For example, on active OSPF control card 12, a lock can be maintained on creating an OSPF adjacency such that a new OSPF adjacency is not established during the initial synchronization.

Hidden OSPF interface 30 is created on both active OSPF control card 12 and standby OSPF control card 18 for each area during initial synchronization. An area refers to a group of contiguous networks and attached hosts. Hidden OSPF interface 30 is a point-to-point unnumbered interface which is used with system 10 and is not exposed to the outside world. Hidden OSPF adjacency 32 is built automatically over hidden OSPF interface 30 due to OSPF neighbor discovery. Database 33 is synchronized through hidden OSPF adjacency 32. Accordingly, there is one hidden OSPF adjacency 32 between active OSPF control card 12 and standby OSPF control card 18 for each area. Accordingly, hidden OSPF adjacencies 32 can be used to synchronize link state database information 23 stored in database 33.

Figure 3:
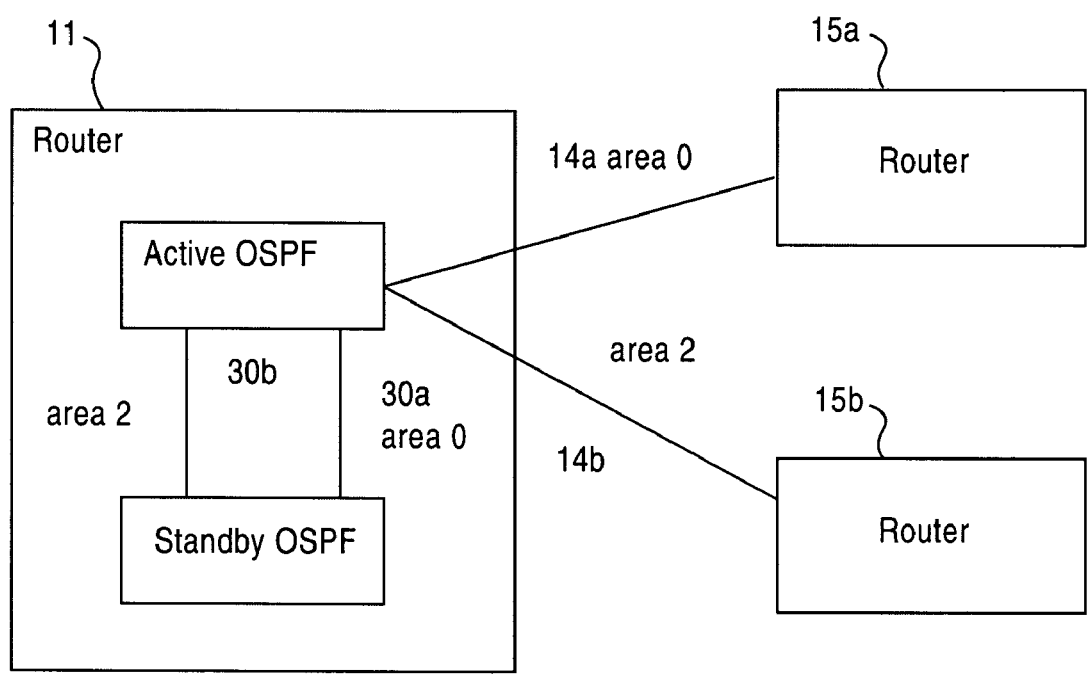
FIG. 3 is a schematic diagram of an implementation of a hidden interface for each OSPF area.

FIG. 3 illustrates an implementation of hidden OSPF interfaces. Router 11 has two interfaces, interface 14*a* belongs to area 0 connecting to router 15*a*, and interface 14*b* belongs to area 2 connecting to Router 15*b*. In router 11, two hidden OSPF interfaces are created for area 0 and area 2, hidden interface 30*a* is created for area 0, and hidden interface 30*b* is created for area 2. Hidden OSPF adjacency 32*a* runs over hidden OSPF interface 30*a*, and hidden OSPF adjacency 32*b* runs over hidden OSPF interface 30*b*. External link state advertisements (LSAs) are synchronized through hidden interface 30*a* for area 0 only.

Referring to FIG. 2, active OSPF control card 12 and standby OSPF control card 18 processes OSPF packets and calculates the shortest path first which decides the shortest path from a router to a destination network by considering cost. Active OSPF control card 12 can send OSPF packets to the line card for transmission to neighbor routers. Standby OSPF control card 18 does not send any OSPF packets to the line card for transmission to neighbor routers. Active OSPF control card 12 and standby OSPF control card 18 route updates to routing table manager (RTM) 34, as shown in FIG. 2. RTM 34 of standby OSPF control card 18 can update redistribution routes to active OSPF control card 12. IP interface manager 35 interfaces system 10 to the Internet Protocol (IP). Command Line Interface (CLI) commands are used to provide the OSPF configuration using datastore 36. Datastore 36 is a task that is responsible for providing storage in memory 38. For example, memory 38 can be a compact flash disc. Accordingly, all information obtained by standby OSPF control card 18 is directly obtained from either active OSPF control card 12, IP interface manager 35 or datastore 36.

An active state is associated with active OSPF control card 12. A standby state is associated with standby OSPF control card 18. A switchover from active OSPF control card 12 to standby OSPF control card 18 can clear upon failure of active OSPF control card 12. When a switchover occurs, standby OSPF control card 18 changes its state to active and takes over all OSPF operations. Standby OSPF control card 19 resumes any suppressed OSPF actions and begins sending OSPF packets to the line card.

Figure 4:
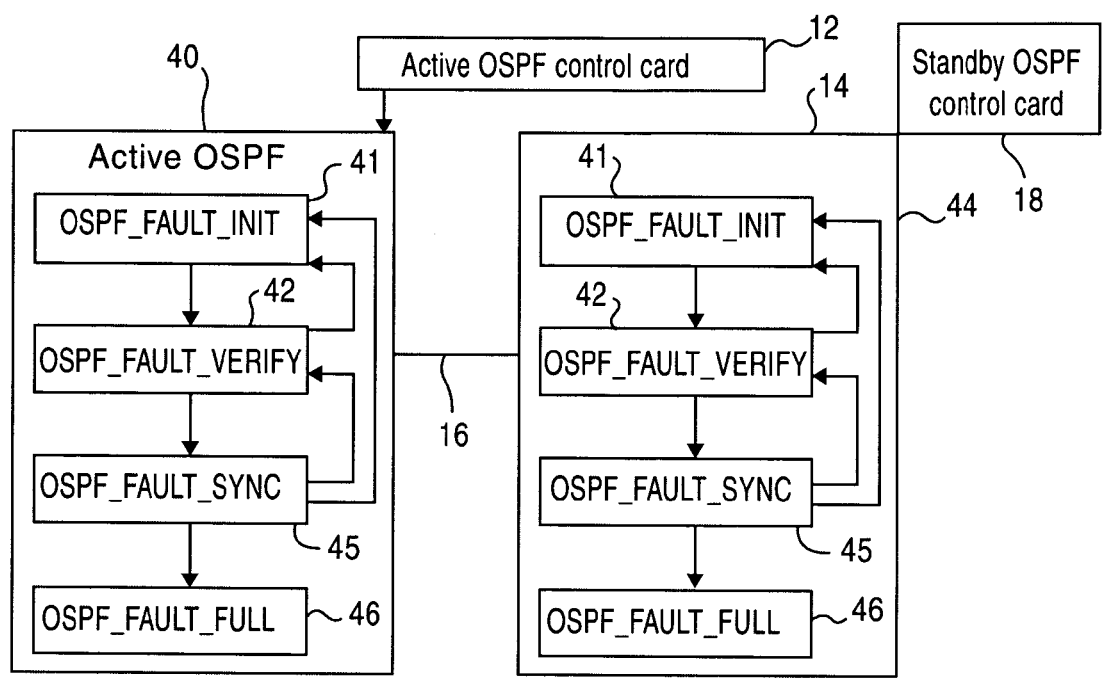
FIG. 4 is a schematic diagram of states of an OSPF process running on the active OSPF control card.

FIG. 4 is a schematic diagram of states of an active OSPF process 40 running on active OSPF control card 12. OSPF_FAULT_INIT state 41 is an initial state of active OSPF process 40. If system 10 is operating with only active OSPF control card 12 operating, system 10 remains in OSPF_FAULT_INIT state 41 awaiting initiation of a standby OSPF control card 18.

Once standby OSPF control card 18 begins operating, OSPF_FAULT_VERIFY state 42 is entered in which standby OSPF control card 18 installs OSPF configuration information 25 received from data store 36 of active OSPF control card 12 which OSPF configuration has been activated on active OSPF control card 12, as shown in FIG. 2. At this time the configuration on active OSPF control card 12 is disabled. OSPF configuration on standby OSPF control card 18 from data store 36 is synchronized and verified with information of active OSPF process 40. Active OSPF process 40 verifies whether standby OSPF process 44 running on standby OSPF control card 18 has a totally synchronous configuration and system information from data store 36. For example, active OSPF control card 12 can verify the interface number and parameters. If the verification fails, active OSPF process 40 can retry after a predetermined time interval, such as a few seconds.

Figure 5:
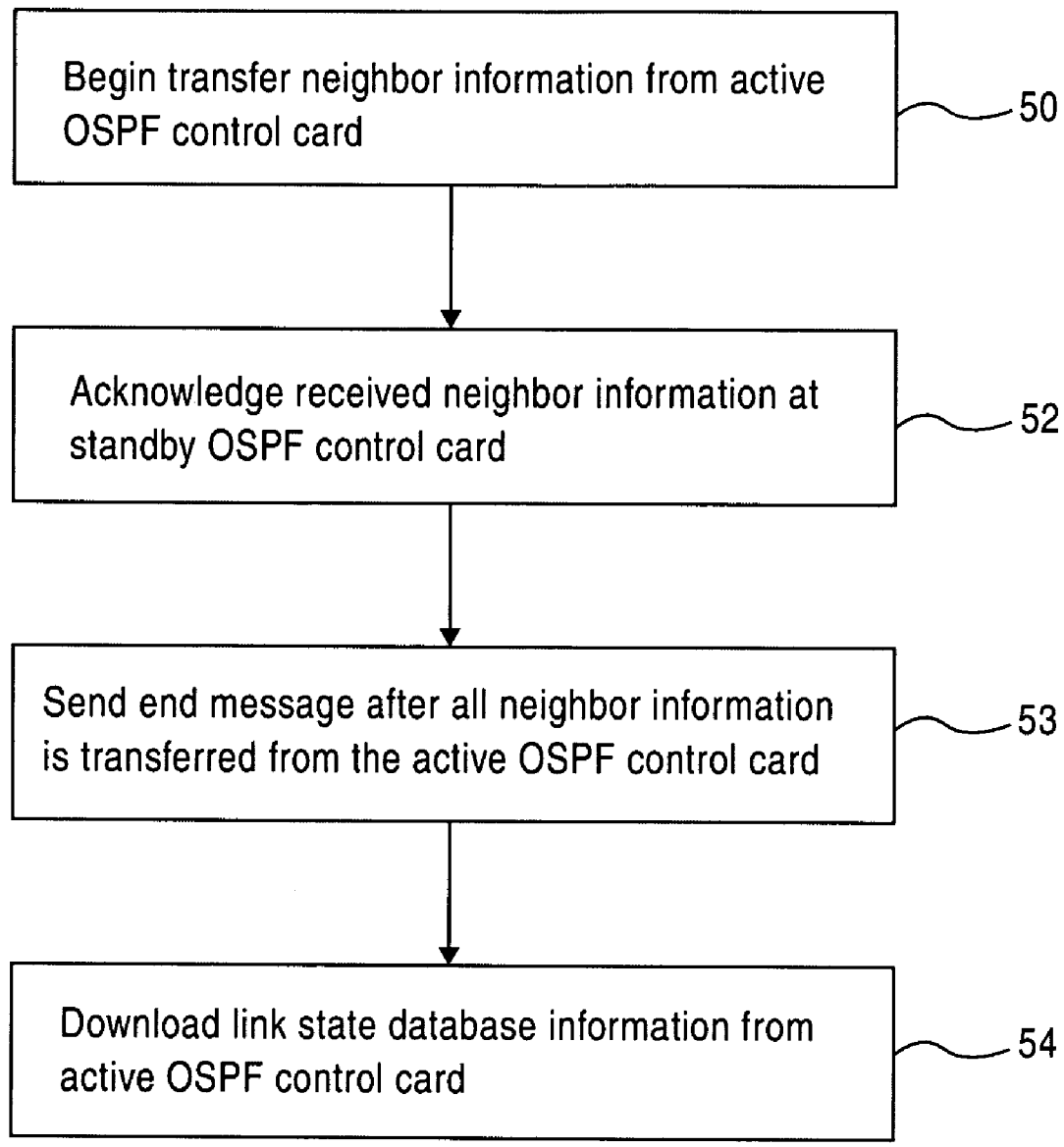
FIG. 5 is a flow diagram of steps for transfer of network link state information from an active process to a standby process.

After verification of the OSPF configuration, active OSPF processes 40 and standby OSPF process 44 enter OSPF_FAULT_SYNC state 45. In OSPF_FAULT_SYNC state 45 neighbor information is transferred over communication link 16 between active OSPF control card 12 and standby OSPF control card 18, as shown in block 50 of FIG. 5. Neighbor information can be transferred from active OSPF process 40 as an IPC message. A plurality of IPC messages can be used to send a large number of neighbors. Standby OSPF process 44 acknowledges the received IPC message and sends an acknowledged IPC message to active OSPF control card 12, as shown in block 52.

During forwarding of neighbor information, active OSPF control card 12 will not accept any new neighbors by ignoring Hello packets from unknown persons. Once all neighbor information has been transferred from active OSPF control card 12 to standby OSPF control card 18, active OSPF control card 12 will forward an end message, as shown in block 53.

Thereafter, standby OSPF process 44 downloads link-state database information from active OSPF control card 12, in block 54. Link-state database information can be synchronized with the use of the internal database synchronization mechanism provided by OSPF, as described in RFC 2328 hereby incorporated by reference into this application. The database synchronization uses a "Database Exchange Process" in which each router describes its database by sending a sequence of Database Description packets to its neighbor. The two routers enter a master/slave relationship. Each Database Description Packet describes a set of LSA's belonging to the router's database. When a neighbor sees an LSA that is more recent than its own database copy, it makes a note that the newer LSA should be requested. Each Database Description packet has a sequence number. Database Description packets (Polls) sent by the master are acknowledged by the slave by echoing the sequence number. Both Polls and responses contain summaries of link state data. The master is the only one allowed to retransmit Database Description Packets which can be done at fixed intervals. When the Database Description Process has completed, the databases are deemed synchronized and the routers are marked fully adjacent. At this time the adjacency is fully functional and is advertised in the two routers-LSA's. Hidden OSPF adjacency 32 is determined between active OSPF control card 12 and standby OSPF control card 18 for downloading the link-state database information 23. Upon receipt of a database requirement message at active OSPF control card 12 from standby OSPF control card 18, active OSPF control card 12 is aware that standby OSPF control card 18 is starting to download link-state database information 23. Downloading of link-state database information continues until a synchronous link-state database exists in active OSPF control card 12 and standby OSPF control card 18.

After standby OSPF control card 18 has a synchronous link-state database with active OSPF control card 12, active OSPF control card 12 and standby OSPF control card 18 enter OSPF_FAULT_FULL state 46. OSPF_FAULT_FULL state 46 is a hot standby state in which standby OSPF control card 18 can immediately take over all operations of active OSPF control card 12 upon failure. In OSPF_FAULT_FULL state 46, hidden OSPF interfaces 30 and hidden adjacencies 32 are removed. Active OSPF process 40 incrementally updates any changes to standby OSPF process 44 by immediately sending updated OSPF state information 24, OSPF configuration information 25, OSPF adjacencies information 26, OSPF interface information 27 and OSPF global protocol information 28 to standby OSPF control card 18 through RCM 20 using IPC messages. Any neighbor state or loss of a neighbor adjacency changes to active OSPF control card 12 are immediately transferred to standby OSPF control card 18 over communication link 18. Any link-state database change is transferred to backup OSPF control card 18 with conventional OSPF synchronization mechanisms over communication link 15.

Configuration changes in the active OSPF control card can be forwarded to backup OSPF control card 18 as an IPC message to trigger standby OSPF control card 18 to read updated information from data store 36. Alternatively, a configuration command can be forwarded from CLI to backup OSPF control module 18.

If a failure of active OSPF control card 12 occurs when standby OSPF control card 18 is in the OSPF_FAULT_FULL state, the standby OSPF control card 18 immediately takes over all OSPF operations. If a failure of active OSPF control card 12 occurs when standby OSPF control card 18 is in one of the states of OSPF_FAULT_INIT state 41, OSPF_FAULT_VERIFY state 12 or OSPF_FAULT_SYNC state 45, it indicates that the standby is not in a full redundant state, and the standby card will be reset. Because the system has not reached a redundant state, a failure of the active card will interrupt the service.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A method, comprising:
    providing a router having an active processor means and a standby processor means;
    building a removable hidden Open Shortest Path First (OSPF) interface on said active processor means and a hidden OSPF interface on said standby processor means for each area during initial synchronization, each area being a group of contagious networks and attached hosts, the hidden OSPF interface on said active processor means and the hidden OSPF interface on said standby processor means being unexposed and at least one hidden adjacency for synchronizing databases on the active processor means and on the standby processor means being automatically built for each area over the hidden OSPF interface on said active processor means and the hidden OSPF interface on said standby processor means;
    connecting said hidden OSPF interface of said active processor means to said hidden OSPF interface of said standby processor means over a communications link;
    synchronizing an OSPF routing database using an OSPF network link protocol over said hidden OSPF interface, such that said OSPF routing database is synchronized when said hidden OSPF interface of said active processor means and said hidden OSPF interface of said standby processor means reach a full adjacency state;
    transferring OSPF network link protocol information from said hidden OSPF interface of said active processor means to said hidden OSPF interface of said standby processor means over said communications link to mirror states of said active processor means and said standby processor means by maintaining a synchronization state machine for each task within a protocol;
    removing said hidden interface of said active processor means and said hidden interface of said standby processor means; and
    assuming control by said standby processor means when a failure is detected in said active processor means and wherein all states of said link protocol immediately function as if the failure had not occurred.

2. The method of claim 1, wherein said OSPF protocol information is OSPF configuration information, OSPF adjacencies information, OSPF interface information and OSPF global protocol information.

3. The method of claim 2, wherein transferring OSPF network link protocol information is performed by:
    creating a hidden OSPF interface for each area of said active processor;
    creating a hidden OSPF interface for each area of said standby processor; and
    forwarding said OSPF network link protocol information from said hidden OSPF interface of said active processor to said hidden OSPF interface of said standby processor until said link state database of said standby processor is synchronized with said link state database of said active processor.

4. The method of claim 3, further comprising forwarding said OSPF configuration information, OSPF adjacencies information, OSPF interface information and OSPF global protocol information, using said hidden OSPF interface of said active processor and said hidden OSPF interface of said standby processor.

5. The method of claim 3, wherein said OSPF network link protocol information is in the form of Inter Process Control messages.

6. The method of claim 2, wherein said OSPF configuration information is determined from Commercial Line Interface commands stored in a datastore.

7. The method of claim 1, further comprising:
    updating network link protocol information at said active processor means; and
    forwarding said updated network link protocol information to said standby processor means.

8. The method of claim 1, wherein said synchronizing is a process based on a Database Exchange Process of the OSPF protocol.

9. The method of claim 1, further comprising processing identical OSPF packets after synchronizing said link configuration and link protocol states between said active processor and said standby processor.

10. A system, comprising:
an active processor unit;
a standby processor unit;
a unit configured to build a removable hidden Open Shortest Path First (OSPF) interface on said active processor unit and a hidden OSPF interface on said standby processor unit for each area during initial synchronization, each area being a group of contagious networks and attached hosts, the hidden OSPF interface on said active processor unit and the hidden OSPF interface on said standby processor unit being unexposed and at least one hidden adjacency for synchronizing databases on the active processor unit and on the standby processor unit being automatically built for each area over the hidden OSPF interface on said active processor unit and the hidden OSPF interface on said standby processor unit;
a unit configured to connect said hidden OSPF interface of said active processor unit to said hidden OSPF interface of said standby processor unit over a communications link;
a unit configured to synchronize an OSPF routing database using an OSPF network link protocol over said hidden OSPF interface, such that said OSPF routing database is synchronized when said hidden OSPF interface of said active processor unit and said hidden OSPF interface of said standby processor unit reach a full adjacency state;
a unit configured to transfer OSPF network linik protocol information from said hidden OSPF interface of said active processor unit to said hidden OSPF interface of said standby processor unit over said communications link to mirror states of said active processor unit and standby processor unit;
a redundant card manager to maintain a synchronization state machine of said states for tasks of said OSPF protocol;
a unit configured to remove said hidden interface of said active processor unit and said hidden interface of said standby processor unit; and
a unit configured to assume control by said standby processor unit when a failure is detected in said active processor unit and wherein all states of said link protocol immediately function as if the failure had not occurred.

11. The system of claim 10, wherein said OSPF protocol information is OSPF configuration information, OSPF adjacencies information, OSPF interface information and OSPF global protocol information.

12. The system of claim 11, wherein said unit configured to transfer OSPF network link protocol information comprises:
a unit for creating a hidden OSPF interface on for each area of said active processor;
a unit for creating a hidden OSPF interface for each area of said standby processor; and
a unit for forwarding said OSPF network link information from said hidden OSPF interface of said active processor to said hidden OSPF interface of said standby processor until said link state database of said standby processor is synchronized with said link state database of said active processor.

13. The system of claim 12, wherein said unit configured to transfer OSPF network link protocol information comprises forwarding said OSPF configuration information, said OSPF adjacencies information, said OSPF interface information and said OSPF global protocol information using said hidden OSPF interface of said active processor and said hidden OSPF interface of said standby processor.

14. The system of claim 10, wherein said OSPF network linik protocol information is transferred through said redundant card manager.

15. The system of claim 14, further comprising a task manager for determining said OSPF network link protocol states of said tasks and transferring said OSPF network ink protocol states to said redundant card manager.

16. The system of claim 14, wherein said unit for switching said router to said standby processor comprises a software redundancy manager which interacts with said redundant card manager to indicate switch over from said active processor to said standby processor.

17. The system of claim 14, wherein said state of said tasks enters an OSPF_FAULT_INIT state which is an initial state before coupling of standby processor to said active processor.

18. The system of claim 14, wherein said state of said tasks enters an OSPF_FAULT_VERIFY state which is entered during synchronization of said link configuration of said active processor and said standby processor.

19. The system of claim 14, wherein said state of said tasks enters an OSPF_FAULT_SYNC state during forwarding of said OSPF network link protocol information from said active processor to said standby processor, said OSPF network link protocol information comprising link-state database information, Open Shortest Path First (OSPF) configuration information, OSPF adjacencies information, OSPF interface information and OSPF global protocol information.

20. The system of claim 14, wherein said state of said tasks enters an OSPF_FAULT_FULL state after said transferring OSPF network link protocol information, said OSPF FAULT_FULL state is a hot standby state wherein said standby state can immediately take over all operations of said standby processor.

21. The system of claim 10, wherein said active processor is an active Open Shortest Path First (OSPF) control card.

22. The system of claim 10, wherein said standby processor is a standby Open Shortest Path First (OSPF) control card.

23. The system of claim 10, wherein said OSPF configuration information is determined from Command Line Interface commands stored in a datastore.

24. The system of claim 10, further comprising:
a unit for updating network link protocol information at said active processor unit; and
a unit for forwarding said updated network link protocol information to said standby processor unit.

25. The system of claim 10, wherein said forwarding is a process based in a Database Exchange Process of the OSPF protocol.

26. The system of claim 10, further comprising:
a unit for processing identical OSPF packets after synchronizing said link configuration and link protocol states between said active processor and said standby processor.

27. A computer program embodied on a computer readable medium, the computer program product for implementing Open Shortest Path First (OSPF) redundancy and being configured to perform:
providing a router having an active processor means and a standby processor means;
building a removable hidden OSPF interface on said active processor means and a hidden OSPF interface on said standby processor means for each area during initial synchronization, each area being a group of contagious networks and attached hosts, the hidden OSPF interface on said active processor means and the hidden OSPF interface on said standby processor means being unexposed and at least one hidden adjacency for synchronizing databases on the active processor means and on the standby prosessor means being automatically built for each area over the hidden OSPF interface on said active processor means and the hidden OSPF interface on said standby processor means;

connecting said hidden OSPF interface of said active processor means to said hidden OSPF interface of said standby processor means over a communications link;

synchronizing an OSPF routing database using an OSPF network link protocol over said hidden OSPF interface, such that said OSPF routing database is synchronized when said hidden OSPF interface of said active processor means and said hidden OSPF interface of said standby processor means reach a full adjacency state;

transferring OSPF network link protocol information from said hidden OSPF interface of said active processor means to said hidden OSPF interface of said standby processor means over said communications link to mirror states of said active processor means and said standby processor means by maintaining a synchronization state machine for each task within a protocol;

removing said hidden interface of said active processor means and said hidden interface of said standby processor means; and assuming control by said standby processor means when a failure is detected in said active processor means and wherein all states of said link protocol immediately function as if the failure had not occurred.

28. An apparatus, comprising:
an active processor unit;
a standby processor unit;
a unit configured to build a removable hidden Open Shortest Path First (OSPF) interface on said active processor unit and a hidden OSPF interface on said standby processor unit for each area during initial synchronization, each area being a group of contiguous networks and attached hosts, the hidden OSPF interface on said active processor unit and the hidden OSPF interface on said standby processor unit being unexposed and at least one hidden adjacency for synchronizing databases on the active processor unit and on the standby processor unit being automatically built for each area over the hidden OSPF interface on said active processor unit and the hidden OSPF interface on said standby processor unit;
a unit configured to connect said hidden OSPF interface of said active processor unit to said hidden OSPF interface of said standby processor unit over a communications link;
a unit configured to synchronize an OSPF routing database using an OSPF network link protocol over said hidden OSPF interface, such that said OSPF routing database is synchronized when said hidden OSPF interface of said active processor unit and said hidden OSPF interface of said standby processor unit reach a full adjacency state;
a unit configured to transfer OSPF network link protocol information from said hidden OSPF interface of said active processor unit to said hidden OSPF interface of said standby processor unit over said communications link to mirror states of said active processor unit and standby processor unit;
a redundant card manager to maintain a synchronization state machine of said states for tasks of said OSPF protocol;
a unit configured to remove said hidden interface of said active processor unit and said hidden interface of said standby processor unit; and
a unit configured to assume control by said standby processor unit when a failure is detected in said active processor unit and wherein all states of said link protocol immediately function as if the failure had not occurred.

29. The apparatus of claim 28, wherein said OSPF protocol information is OSPF configuration information, OSPF adjacencies information, OSPF interface information and OSPF global protocol information.

30. The apparatus of claim 29, wherein said unit configured to transfer OSPF network link protocol information comprises:
a unit for creating a hidden OSPF interface on for each area of said active processor;
a unit for creating a hidden OSPF interface for each area of said standby processor; and
a unit for forwarding said link-state database information from said hidden OSPF interface of said active processor to said hidden OSPF interface of said standby processor until said link state database of said standby processor is synchronized with said link state database of said active processor.

31. The apparatus of claim 30, wherein said unit configured to transfer OSPF network link protocol information comprises forwarding said OSPF configuration information, said OSPF adjacencies information, said OSPF interface information and said OSPF global protocol information using said hidden OSPF interface of said active processor and said hidden OSPF interface of said standby processor.

32. The apparatus of claim 28, wherein said OSPF configuration information is determined from Command Line Interface commands stored in a datastore.

33. The apparatus of claim 28, further comprising:
a unit for updating network link protocol information at said active processor unit; and
a unit for forwarding said updated network link protocol information to said standby processor unit.

34. The apparatus of claim 28, wherein said forwarding is a process based in a Database Exchange Process of the OSPF protocol.

35. The apparatus of claim 28, further comprising:
a unit for processing identical OSPF packets after synchronizing said link configuration and link protocol states between said active processor and said standby processor.

36. The apparatus of claim 28, wherein said OSPF network link protocol information is transferred through said redundant card manager.

37. The apparatus of claim 36, further comprising a task manager for determining said OSPF network link protocol states of said tasks and transferring said OSPF network link protocol states to said redundant card manager.

38. The apparatus of claim 36, wherein said unit for switching said router to said standby processor comprises a software redundancy manager which interacts with said redundant card manager to indicate switch over from said active processor to said standby processor.

39. The apparatus of claim 36, wherein said state of said tasks enters an OSPF_FAULT_INIT state which is an initial state before coupling of standby processor to said active processor.

40. The apparatus of claim 36, wherein said state of said tasks enters an OSPF_FAULT_VERIFY state which is entered during synchronization of said link configuration of said active processor and said standby processor.

41. The apparatus of claim 36, wherein said state of said tasks enters an OSPF_FAULT_SYNC state during forwarding of said OSPF network link protocol information from said active processor to said standby processor, said OSPF network link protocol information comprising link-state database information, Open Shortest Path First (OSPF) configuration information, OSPF adjacencies information, OSPF interface information and OSPF global protocol information.

42. The apparatus of claim 36, wherein said state of said tasks enters an OSPF_FAULT_FULL state after said transferring OSPF network link protocol information, said OSPF_FAULT_FULL state is a hot standby state wherein said standby state can immediately take over all operations of said standby processor.

43. The apparatus of claim 28, wherein said active processor is an active Open Shortest Path First (OSPF) control card.

44. The apparatus of claim 28, wherein said standby processor is a standby Open Shortest Path First (OSPF) control card.

45. An apparatus, comprising:

active processor unit means for processing;

standby processor unit means for processing;

building means for building a removable hidden Open Shortest Path First (OSPF) interface on said active processor unit and a hidden OSPF interface on said standby processor unit for each area during initial synchronization, each area being a group of contiguous networks and attached hosts, the hidden OSPF interface on said active processor unit and the hidden OSPF interface on said standby processor unit being unexposed and at least one hidden adjacency for synchronizing databases on the active processor unit and on the standby processor unit being automatically built for each area over the hidden OSPF interface on said active processor unit and the hidden OSPF interface on said standby processor unit;

connecting means for connecting said hidden OSPF interface of said active processor unit to said hidden OSPF interface of said standby processor unit over a communications link;

synchronizing means for synchronizing an OSPF routing database using an OSPF network link protocol over said hidden OSPF interface, such that said OSPF routing database is synchronized when said hidden OSPF interface of said active processor unit and said hidden OSPF interface of said standby processor unit reach a full adjacency state;

transferring means for transferring OSPF network link protocol information from said hidden OSPF interface of said active processor unit to said hidden OSPF interface of said standby processor unit over said communications link to mirror states of said active processor unit and standby processor unit;

redundant card manager means for maintaining a synchronization state machine of said states for tasks of said OSPF protocol;

removing means for removing said hidden interface of said active processor unit and said hidden interface of said standby processor unit; and control means for assuming control by said standby processor unit when a failure is detected in said active processor unit and wherein all states of said link protocol immediately function as if the failure had not occurred.

* * * * *

UNITED STATES PATENT AND TRADEMARK OFFICE
CERTIFICATE OF CORRECTION

PATENT NO. : 7,490,161 B2
APPLICATION NO. : 09/934884
DATED : February 10, 2009
INVENTOR(S) : Wenge Ren It is certified that error appears in the above-identified patent and that said Letters Patent is hereby corrected as shown below:

In Column 9

Claim 10, line 27, should read:
--a unit configured to transfer OSPF network link protocol--

In Column 10

Claim 14, line 2, should read:
--network link protocol information is transferred through--

Claim 15, line 6, should read:
--states of said tasks and transferring said OSPF network link--

In Column 13, Claim 45

Line 18, should read:
--active processor means for processing;--

Line 19, should read:
--standby processor means for processing;--

Line 23, should read:
--processor means for each area during initial synchronization--

Line 26, should read:
--processor means and the hidden OSPF interface on said--

In Column 13, Claim 45

Line 27, should read:
--standby processor means being unexposed and at least one--

Line 29, should read:
--active processor means and on the standby processor--

In Column 14, Claim 45

Line 1, should read:
--OSPF interface on said active processor means and the--

UNITED STATES PATENT AND TRADEMARK OFFICE
CERTIFICATE OF CORRECTION

PATENT NO. : 7,490,161 B2
APPLICATION NO. : 09/934884
DATED : February 10, 2009
INVENTOR(S) : Wenge Ren It is certified that error appears in the above-identified patent and that said Letters Patent is hereby corrected as shown below:

Line 2, should read:
--hidden OSPF interface on said standby processor means--

Line 4, should read:
--face of said active processor means to said hidden OSPF--

Line 5, should read:
--interface of said standby processor means over a communications--

Line 11, should read:
--face of said active processor means and said hidden OSPF--

In Column 14, Claim 45

Line 12, should read:
--interface of said standby processor means reach a full--

Line 16, should read:
--said active processor means to said hidden OSPF interface--

Line 17, should read:
--of said standby processor means over said communications--

Line 18, should read:
--link to mirror states of said active processor means and--

Line 19, should read:
--standby processor means--

Line 24, should read:
--active processor means and said hidden interface of said--

Line 25, should read:
--standby processor means; and--

UNITED STATES PATENT AND TRADEMARK OFFICE
CERTIFICATE OF CORRECTION

PATENT NO. : 7,490,161 B2
APPLICATION NO. : 09/934884
DATED : February 10, 2009
INVENTOR(S) : Wenge Ren It is certified that error appears in the above-identified patent and that said Letters Patent is hereby corrected as shown below:

Line 27, should read:
--processor means when a failure is detected in said active--

Line 28, should read:
--processor means and wherein all states of said link protocol--

Signed and Sealed this

Twelfth Day of May, 2009

JOHN DOLL
*Acting Director of the United States Patent and Trademark Office*